3,702,357
UNIFORMITY OF POLYESTER FILMS
Edward W. Smith, Jr., Rochester, N.Y., assignor to Eastman Kodak Company, Rochester, N.Y.
No Drawing. Continuation of abandoned application Ser. No. 820,662, Apr. 30, 1969. This application June 25, 1971, Ser. No. 157,045
Int. Cl. B29c 17/02, 25/00
U.S. Cl. 264—289    3 Claims

ABSTRACT OF THE DISCLOSURE

Conventionally heat-set, biaxially oriented polyester films such as poly(ethylene terephthalate) generally have non-uniform physical properties across the width of the film. It has been discovered that the relative uniformity of such properties across the width of the film can be significantly increased by stretching the film in the transverse direction (during the tentering step) while the surfaces of the film are maintained at a substantially uniform temperature of at least about 260° F., which is higher than was heretofore believed practical in a tentering operation.

---

This application is a continuation of Ser. No. 820,662 filed Apr. 30, 1969, now abandoned.

This invention relates to improved polyester films having not only the excellent dimensional stability of conventional biaxially oriented, heat-set (thermally stabilized) polyester films, but also having a more uniform distribution of physical properties across the width of the film.

The desirability of manufacturing films having substantially uniform physical properties in both the length and width directions at any point across the width of the film is well recognized. In the case of polyester films, a typical example of somewhat undesirable, non-uniform properties is the variation in tensile break strength that exists across films that have been biaxially oriented and heat set via conventional commercial processes for their manufacture. Thus, the tensile break strength shown at one point across the width of a typical conventional biaxially oriented, heat-set polyester film (for example, at a point near one edge of the film) might differ by a factor of as much as 30% or more from that of the same film when tensile break strength is measured at a point near the center of the film. More uniformity of the various physical properties (such as, for example, tensile break strength, tensile yield, modulus of elasticity, and thermal and humidity coefficient of expansion) of the film across its width is necessary when it is desired to produce films having optimum properties for any of a number of uses, such as a base or support for highest quality photographic films, highest quality engineering drafting sheets, and the like.

Unfortunately conventional processes involving the steps of continuously stretching, tentering, and heat-setting long strips of polyester films invariably results in the production of films having a significant amount of variation (across their widths) in many of their important physical properties. Films that have such significant variations in physical properties across their width have also been found to have a fairly high "birefringence." Birefringence has been found to be somewhat proportional and directly correlatable with the degree of non-uniformity of the various physical properties across the width of the polyester films.

The term "birefringence" refers to the difference in refractive indicies between the major and the minor directions in the plane of the film. Thus, a birefringence value of 0 indicates that the sheet of film has uniformly balanced properties in all directions in the plane of the sheet at the point at which the birefringence is measured. Theoretically, optimum biaxially oriented, heat-set polyester films should have their major axis parallel to either the length or width of the film. The minor axis is always perpendicular to the major axis, in either case. Also, for optimum uniformity, the extent or amount of birefringence must be essentially very low across the entire width of the film. Thus, if the direction of the major axis is exactly parallel to the width (or length) of the film in the center of the film, for optimum stability and uniformity, the direction of the major axis should be parallel to the width (or length) of the film at every point across the width of the film and the birefringence should be very low at each point across the film, too. Birefringence values would be expected to amount to as much as 0.020 or more in conventionally commercially produced poly(ethylene terephthalate) films, for example.

It has now been discovered that the relatively high birefringence values described above can be reduced substantially or even practically eliminated, provided that the polyester film is subjected to an unusually high temperature during that stage or step of the overall manufacturing process in which the film is stretched laterally or tentered. Actually the temperatures of the film surfaces must be at least about 260° F., and up to about 330° F., during at least about 80% of the time in which the film is being tentered. As a practical matter the temperature of the film surfaces cannot be within the essential region (that is, above about 260° F.) during the entire tentering step because of the amount of time necessary to raise the temperature of the film surfaces into the essential region from temperatures below about 250° F. (at which the film should be preheated prior to the tentering step). For some apparently unexplainable reason, for the successful practice of this invention, the essential (film surface) temperatures must be attained simultaneously with at least the initial stages of the transverse stretching or tentering step. Thus, it has been the experience heretofore that the use of such very high film temperature levels prior to the actual tentering operation (for example, in a "preheat" section of a conventional polyester film machine) resulted in increased birefringence values, apparently due to an undesirable degree or type of crystallization occurring in the film during such a high temperature "preheat" step.

As it was indicated hereinbefore, the present processes can be used to correct the undesirable variation in valuable physical properties across the width of the film described hereinbefore no matter what the detailed previous history of the film had been, so long as the film is a mainly linear polyester and can be biaxially oriented. Such polyester films are made commercially, for example, via processes such as those described in U.S. Patent 2,779,684 and in U.S. Patent 2,823,421. Any polyester than can be manufactured in the form of a film and that can be biaxially oriented and "heat-set" in accordance with such processes as those of these patents can be treated successfully in the practice of the present invention. However, in the preferred practice of this invention, the films that are treated are those comprising poly(ethylene terephthalate) or poly(cyclohexylene-1,4-dimethylene terephthalate).

TABLE I

| Stretch air temp., °F. | Birefringence | | | Young's modulus differential, p.s.i. (major-minor) | | Break elongation differential, percent (major-minor) | | Maximum shrinkage differential at approx. 173° C., percent (major-minor) | |
|---|---|---|---|---|---|---|---|---|---|
| | Avg. | Edge | Center | Edge | Center | Edge | Center | Edge | Center |
| 210 | 0.0160 | 0.0200 | 0.0110 | 117,000 | 50,000 | 32 | 17 | 4.3 | 5.0 |
| 310 | 0.0070 | 0.0115 | 0.0005 | 55,000 | 10,000 | 15 | 2 | 1.4 | 0.2 |

Generally, in processes for manufacturing relatively thin films of oriented polyesters, it has been found that, when films are introduced into a relatively hot zone, the surface temperature of the film rises fairly quickly to within about 15° F. of the temperature of the air surrounding the film in the hot zone, although the temperature of the air generally remains slightly higher than that of the film surfaces, particularly when hot air constitutes the main source of heat for the film. Thus, in the tentering step of the present processes, when it is desired to raise the temperature of the film surfaces into the temperature region in which the above-described benefits of this invention can be obtained, it is generally preferred to maintain the temperature of the air in the tentering zone within the range of from about 275° F. to about 340° F. Then, the temperature of the film surfaces increases quickly to the effective range after the film is introduced into this region that contains very hot gas. Thus, the effective film surface temperature is attained within a very short time of that point in time at which the tentering operation is begun (when the film is introduced into the relatively hotter tenter zone), and is maintained though at least about 80% of the tentering step.

EXAMPLE

In the production of a nominal 4 mil film of poly(ethylene terephthalate) on a conventional, commercial machine, the air temperature utilized in the tenter was maintained at approximately 310° F. while all other operating parameters were held essentially constant. A comparison (conventional production run was made utilizing an air temperature in the tenter of 210° F. The birefringence of the film made via the conventional procedure at 210° F. had an average value across a 4 foot width of the film of 0.016, while the birefringence of the film manufacture in accordance with the present invention (using a tenter air temperature of 310° F.) had an average birefringence across the film of less than half that (0.007). In the table below are listed some comparative data resulting from several physical tests performed on the resulting films. Note that the film made via the present process has generally significantly better properties than that of the conventionally prepared comparison.

The invention has been described in detail with particular reference to preferred embodiments thereof, but it will be understood that variations and modifications can be effected within the spirit and scope of the invention.

I claim:

1. In a process for manufacturing biaxially oriented polyester film in which the polyester is comprised of repeating residues of glycol and dicarboxylic acid or ester units, which process comprises biaxially orienting said film by stretching it longitudinally and transversely at an elevated temperature; the improvement which comprises raising the temperature of the surface of the film within the range of from about 260° F. to about 330° F. substantially simultaneously with at least the initial stages of the transverse stretching, and maintaining the temperature substantially uniform across the surface of the film within said range during at least about 80% of the time in which said film is being stretched transversely, said temperature of the surface of the film being below the melting temperature of the polyester.

2. An improved process as in claim 1, wherein said polyester is poly(ethylene terephthalate).

3. An improved process as in claim 1, wherein said polyester is poly(cyclohexylene 1,4-dimethylene terephthalate).

References Cited

UNITED STATES PATENTS

| 2,779,684 | 1/1957 | Alles | 264—289 |
| 2,823,421 | 2/1958 | Scarlett | 264—289 |
| 3,161,711 | 12/1964 | Tassler | 264—289 |
| 3,429,961 | 2/1969 | Spencer | 264—289 |

FOREIGN PATENTS

| 235,432 | 9/1961 | Australia | 264—289 |

ROBERT F. WHITE, Primary Examiner

J. R. THURLOW, Assistant Examiner

U.S. Cl. X.R.

260—75 R; 264—210 R, 235, 290 T, 346